United States Patent

Shukunami et al.

[11] Patent Number: 6,134,046
[45] Date of Patent: Oct. 17, 2000

[54] OPTICAL AMPLIFYING FIBER AND FORMING METHOD FOR FIBER GRATING

[75] Inventors: Norifumi Shukunami, Sapporo; Shinya Inagaki; Miki Takeda, both of Kawasaki, all of Japan

[73] Assignee: Fujitsu Limited, Kawasaki, Japan

[21] Appl. No.: 09/039,622

[22] Filed: Mar. 16, 1998

[30] Foreign Application Priority Data

Oct. 17, 1997 [JP] Japan ................................ 9-285096

[51] Int. Cl.⁷ ........................................................ H01S 3/00
[52] U.S. Cl. ................................................................ 359/341
[58] Field of Search ................................. 359/341; 372/6

[56] References Cited

U.S. PATENT DOCUMENTS

| | | | |
|---|---|---|---|
| 5,260,823 | 11/1993 | Payne et al. | 359/341 |
| 5,337,382 | 8/1994 | Mizrahi | 385/37 |
| 5,764,829 | 6/1998 | Judkins et al. | 385/37 |
| 5,875,203 | 2/1999 | Wagener et al. | 372/6 |

FOREIGN PATENT DOCUMENTS 8-288573  11/1996  Japan .

*Primary Examiner*—Mark Hellner
*Attorney, Agent, or Firm*—Staas & Halsey LLP

[57] ABSTRACT

An optical amplifying fiber including a core doped with a rare earth element and having a first refractive index, a cladding surrounding the core and having a second refractive index smaller than the first refractive index, and a fiber grating formed in the core for transmitting signal light having a first wavelength and pump light having a second wavelength and removing amplified spontaneous emission. The fiber grating is preferably positioned upstream of a middle point of the entire length of the optical amplifying fiber in terms of a propagation direction of signal light.

8 Claims, 14 Drawing Sheets

F I G. 1 0
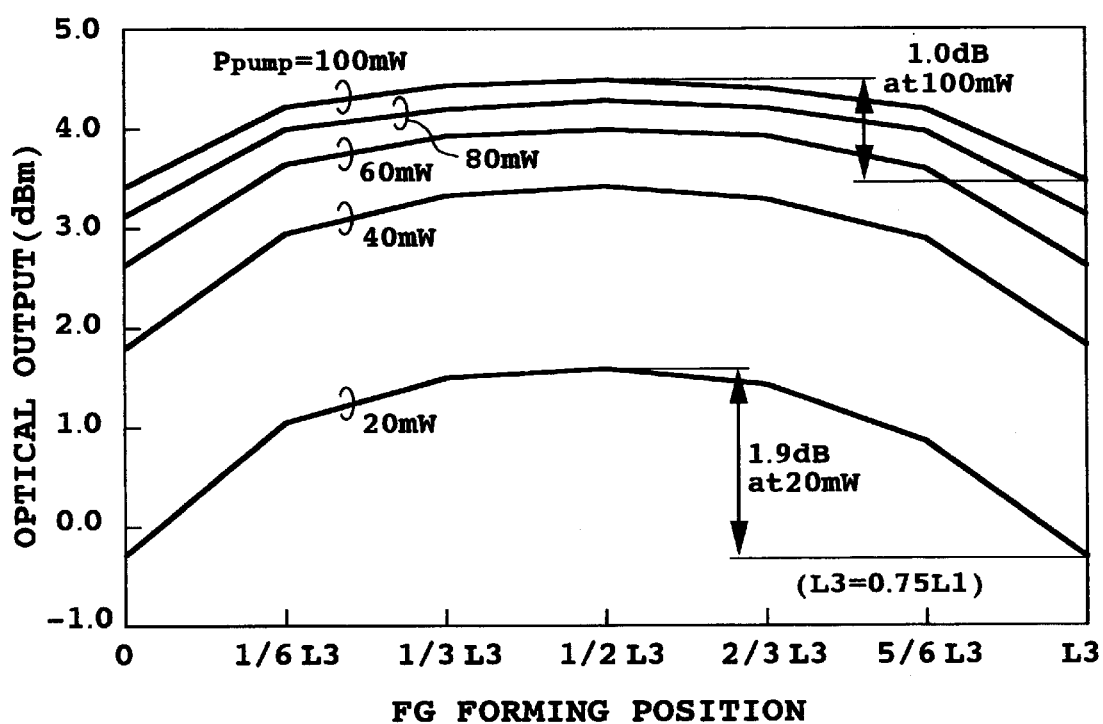

OPTICAL AMPLIFYING FIBER AND FORMING METHOD FOR FIBER GRATING

BACKGROUND OF THE INVENTION

1. Field of the Invention

The present invention relates to an optical amplifying fiber applicable to an optical fiber amplifier and relates also to a forming method for a fiber grating in the optical amplifying fiber.

2. Description of the Related Art

An optical amplifier for directly amplifying an optical signal without having to convert the optical signal into an electrical signal is widely studied as one of key devices in a future optical communication system in many research institutes from a viewpoint that the optical amplifier is a bit-rate-free device in effect, so large-capacity transmission can be easily achieved, and from another viewpoint that simultaneous amplification of multiple channels can be performed. As one form of optical amplifiers, an optical amplifier using a single-mode optical fiber having a core doped with a rare earth element such as Er, Nd, or Yb (which will be hereinafter referred to as a doped fiber) is known. In operation, signal light to be amplified is input into the doped fiber to propagate therein, while pump light is introduced into the doped fiber in the same direction as the propagation direction of the signal light or in the opposite direction.

The optical amplifier using such a doped fiber is called an optical fiber amplifier, which has excellent features of no polarization dependence of gain, low noise, and low coupling loss to an optical transmission line. In putting this kind of optical fiber amplifier into practical use, it is required to ensure a wide wavelength band of signal light that can be amplified with a required gain and also ensure a high conversion efficiency of pump light to signal light.

FIG. 1 shows a schematic configuration of a conventional optical fiber amplifier. Reference numeral 2 denotes an Er doped fiber. Signal light input from an input port 4 and pump light output from a pumping source 6 are combined together by a multiplexer 8 to propagate in the Er doped fiber 2. In the Er doped fiber 2, the pump light is converted into signal light, and the signal light is gradually amplified along the Er doped fiber 2. The amplified signal light is output from an output port 10. Reference numerals 12 and 14 denote optical isolators.

In the above optical fiber amplifier, a conversion efficiency of pump light to signal light is reduced by amplified spontaneous emission (ASE) generated in the Er doped fiber 2. As shown in FIG. 2, ASE 18 is a component different from signal light 16, and the generation of ASE causes a reduction in amplification efficiency of signal light. Therefore, in an optical fiber amplifier, ASE must be efficiently removed to increase the conversion efficiency of pump light to signal light (the amplification efficiency of signal light).

Conventionally, a two-stage amplifier configuration as shown in FIG. 3 has been proposed to remove ASE. Signal light from an input port 4 and pump light from a pumping source 6 are combined together by a multiplexer 8 to forward propagate in Er doped fibers 2 and 20. On the other hand, pump light from a pumping source 22 is combined with the propagating signal light by a multiplexer 24 to backward propagate in the Er doped fiber 20. The pump light is converted into signal light in the Er doped fibers 2 and 20, and the amplified signal light is output from an output port 10. An optical band-pass filter 30 for transmitting the signal light and the pump light and removing ASE is provided between the Er doped fibers 2 and 20. Reference numerals 12, 14, 26, and 28 denote optical isolators. In such a two-stage optical fiber amplifier, ASE can be efficiently removed as shown in FIG. 4.

However, the two-stage optical fiber amplifier as shown in FIG. 3 requires many optical components, causing an increase in cost. Further, since the optical isolators 14 and 26 and the optical band-pass filter 30 are inserted between the two Er doped fibers 2 and 20, these optical components invite insertion loss even at a wavelength of signal light, thus causing a reduction in amplification efficiency of signal light.

In recent years, a fiber grating directly formed in an optical fiber as an optical filter has been developed to be put into practical use. However, a usual fiber grating forms an optical filter for controlling a transmission quantity or reflection quantity of light at an arbitrary wavelength, and it is therefore expected that if the fiber grating is used in an Er doped fiber having a gain of 30 dB or more, the gain is decreased because of a resonance phenomenon.

SUMMARY OF THE INVENTION

It is therefore an object of the present invention to provide an optical amplifying fiber which can increase an amplification efficiency of signal light.

It is another object of the present invention to provide a method of forming a fiber grating in an optical amplifying fiber.

In accordance with an aspect of the present invention, there is provided an optical amplifying fiber comprising a core doped with a rare earth element and having a first refractive index; a cladding surrounding said core and having a second refractive index smaller than said first refractive index; and a fiber grating formed in said core for transmitting signal light having a first wavelength and pump light having a second wavelength and removing amplified spontaneous emission; said fiber grating being positioned upstream of a middle point of the entire length of said optical amplifying fiber in terms of a propagation direction of signal light.

Preferably, the fiber grating is formed in the range of about 17% to about 50% of the entire length of the optical amplifying fiber as measured from a signal light input end of the optical amplifying fiber. The period of the fiber grating is preferably in the range of about 100 μm to about a few 100 μm. Alternatively, the fiber grating may be inclined to a longitudinal direction of the optical amplifying fiber.

In accordance with another aspect of the present invention, there is provided an optical amplifying fiber assembly comprising a first doped fiber having a core doped with a rare earth element and having a first length; a second doped fiber having a core doped with a rare earth element and having a second length longer than the first length; a single-mode fiber interposed between said first and second doped fibers and having opposite ends connected to said first and second doped fibers; and a fiber grating formed in said single-mode fiber for transmitting signal light having a first wavelength and pump light having a second wavelength and removing amplified spontaneous emission; said first doped fiber being positioned upstream of said second doped fiber in terms of a propagation direction of signal light.

In accordance with a further aspect of the present invention, there is provided a method of forming a fiber grating having a given period in an optical amplifying fiber, comprising the steps of applying a carbon coating to a bare fiber doped with a rare earth element; applying a resin coating to said carbon coating; partially removing said resin coating at a fiber grating forming portion where said fiber grating is to be formed later; partially removing said carbon coating by electric discharge at said fiber grating forming portion after said resin coating is partially removed; introducing said optical amplifying fiber into a hydrogen atmosphere to expose only said fiber grating forming portion to said hydrogen atmosphere after said carbon coating is partially removed; and directing ultraviolet radiation onto said fiber grating forming portion to form said fiber grating after said fiber grating forming portion is exposed to said hydrogen atmosphere.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 10 is a graph showing the relation between fiber grating forming portion and optical output when the length of the optical amplifying fiber is a decreased length L3 equal to 0.75L1;

DETAILED DESCRIPTION OF THE PREFERRED EMBODIMENTS

Figure 1:
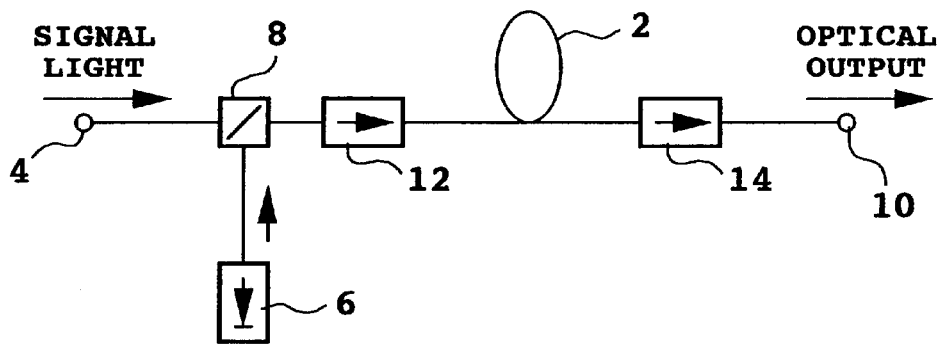
FIG. 1 is a schematic view showing the configuration of a conventional optical fiber amplifier.
Figure 2:
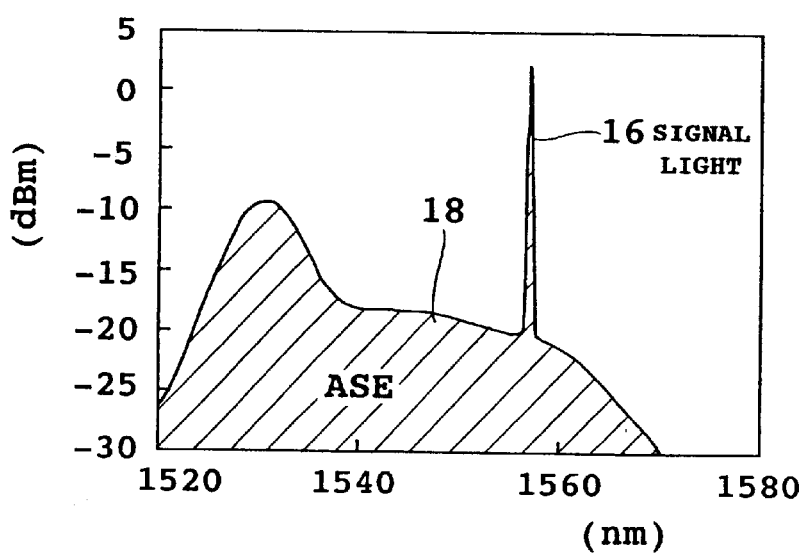
FIG. 2 is a graph showing the relation between signal light and ASE in the optical fiber amplifier shown in FIG. 1.
Figure 3:
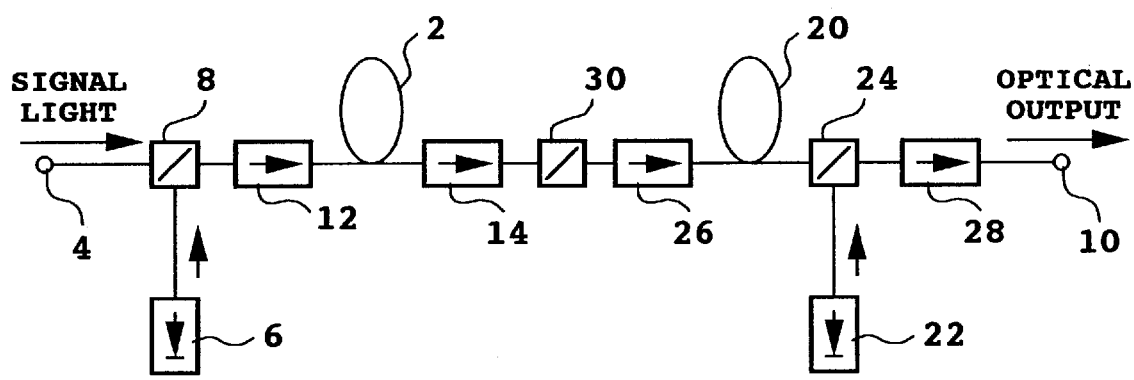
FIG. 3 is a schematic view showing the configuration of a conventional two-stage optical fiber amplifier for removing ASE.
Figure 4:
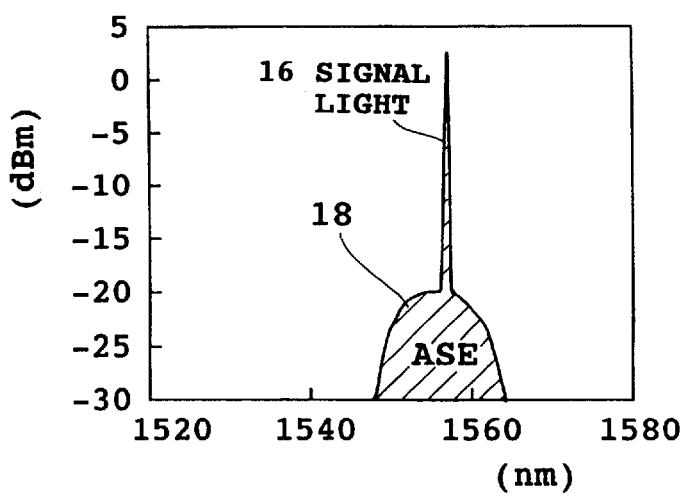
FIG. 4 is a graph showing the relation between signal light and ASE in the configuration shown in FIG. 3.
Figure 5:
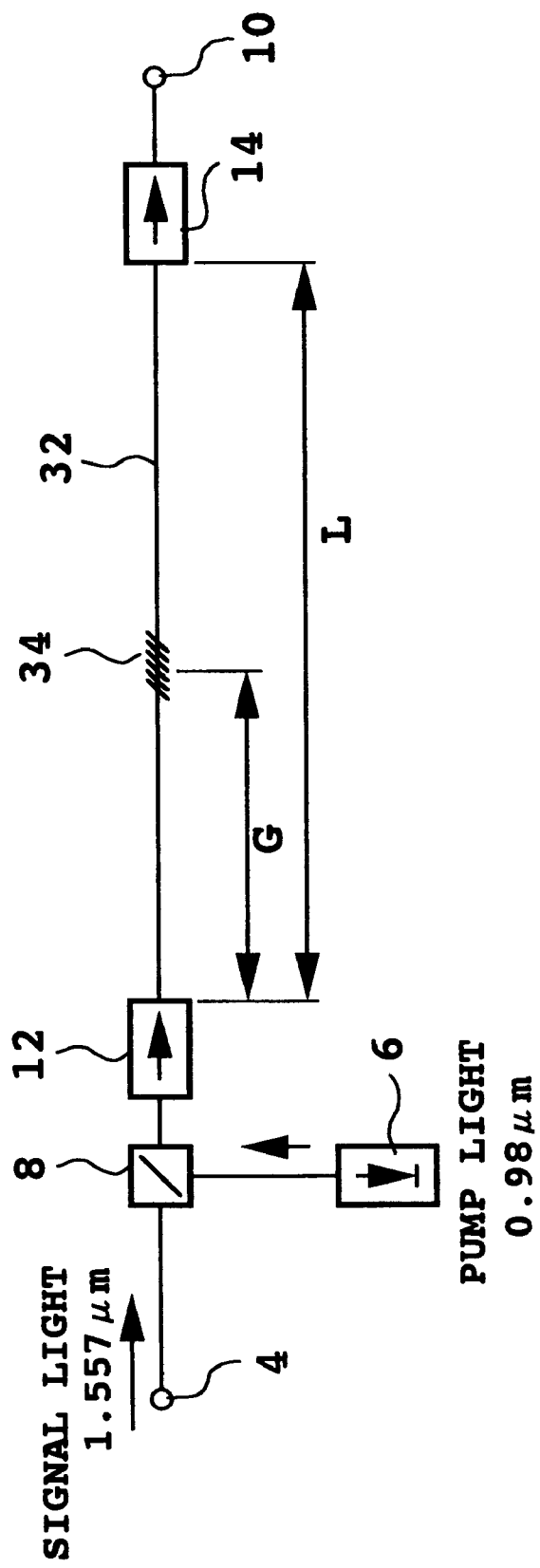
FIG. 5 is a schematic view showing the configuration of an optical fiber amplifier used for simulation of the present invention.

Referring to FIG. 5, there is shown a schematic configuration of an optical fiber amplifier used for calculation of a position where an efficient fiber grating is to be provided. An Er doped fiber 32 has an entire length L, and a fiber grating 34 is formed in the Er doped fiber 32 at a distance G from a most upstream end (signal input end) thereof in terms of a propagation direction of signal light. The Er doped fiber 32 has a core doped with erbium and has a core diameter of 1.8 $\mu$m, a mode field diameter (for a wavelength of 1.557 $\mu$m) of 4.8 $\mu$m, and a cutoff wavelength of 0.92 $\mu$m. The entire length L is 19 m, the Er doping concentration is 450 ppm, and the Al doping concentration is 46,000 ppm.

Signal light having a wavelength of 1.557 $\mu$m and a power of −25 dBm is input to an input port 4, and pump light having a wavelength of 0.98 $\mu$m and a power of 20 to 100 mW is output from a pumping source 6. The signal light and the pump light are combined or multiplexed by a multiplexer 8, and next input through an optical isolator 12 into the Er doped fiber 32. In the Er doped fiber 32, the pump light is converted into signal light, and the signal light is gradually amplified. ASE generated in the Er doped fiber 32 is efficiently removed by the fiber grating 34, and amplified signal light is output from an output port 10 through an optical isolator 14.

Figure 6:
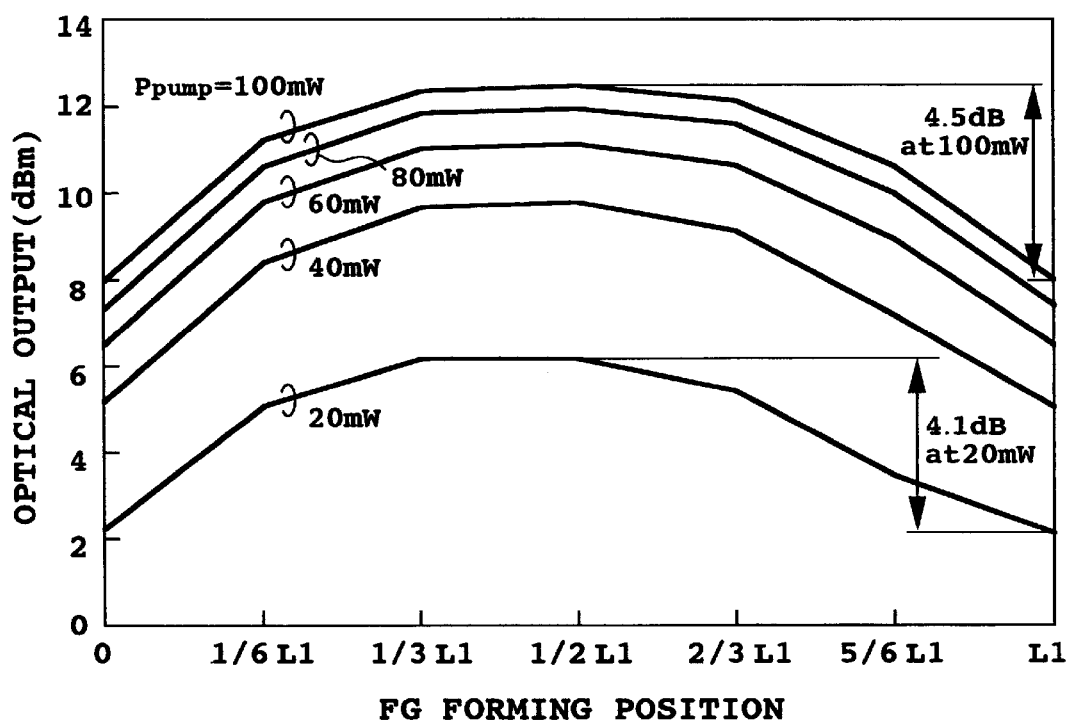
FIG. 6 is a graph showing the relation between fiber grating forming portion and optical output when the length of the optical amplifying fiber is a given length L1.
Figure 7:
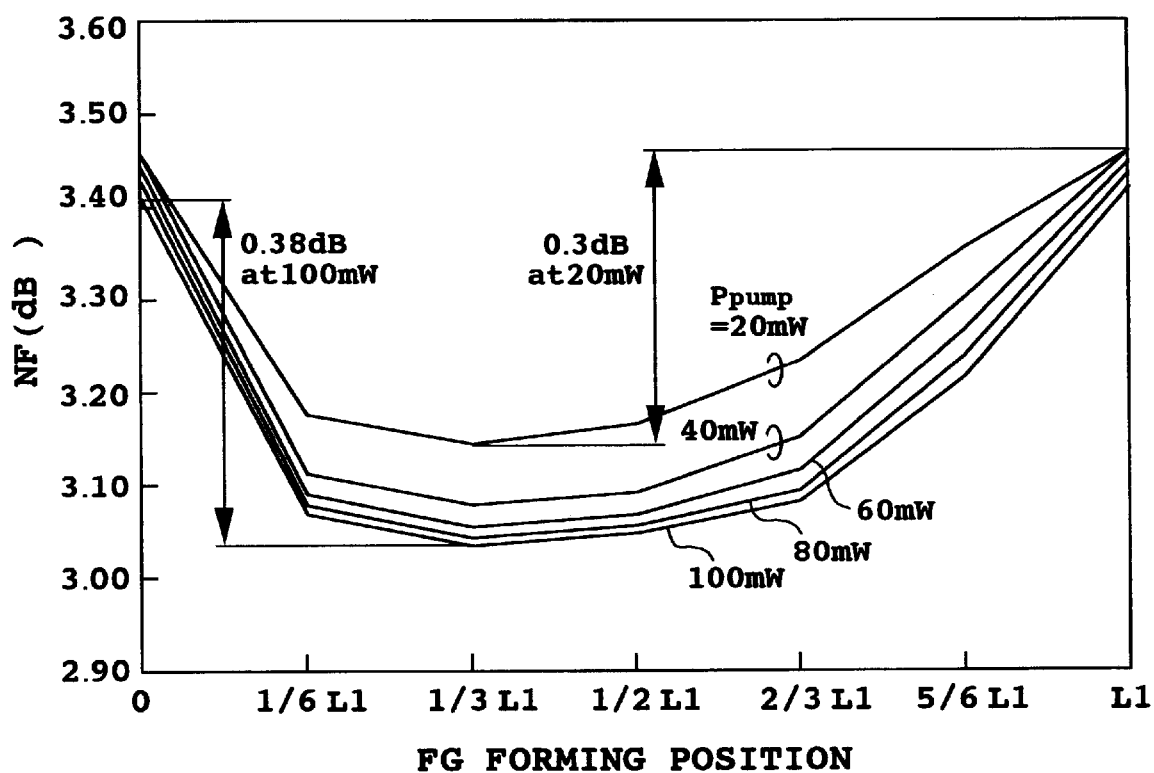
FIG. 7 is a graph showing the relation between fiber grating forming portion and NF when the length of the optical amplifying fiber is a given length L1.

FIG. 6 shows the relation between position of the fiber grating 34 and optical output in the optical fiber amplifier shown in FIG. 5, and FIG. 7 shows the relation between position of the fiber grating 34 and noise figure (NF). The pump light power was changed in the range of 20 to 100 mW. As apparent from FIGS. 6 and 7, the fiber grating 34 is positioned preferably upstream of a middle point of the entire length L (L1) of the Er doped fiber in terms of the propagation direction of signal light, so as to increase the optical output and decrease the NF. More specifically, the fiber grating 34 is formed in the range of about 17% to about 50% of the entire length L (L1) of the Er doped fiber as measured from the most upstream end thereof. It is clear from FIGS. 6 and 7 that the optical output has increased by 4.1 to 4.5 dB and the NF has decreased by 0.3 to 0.38 dB by providing the fiber grating 34 at the above specific position.

Figure 8:
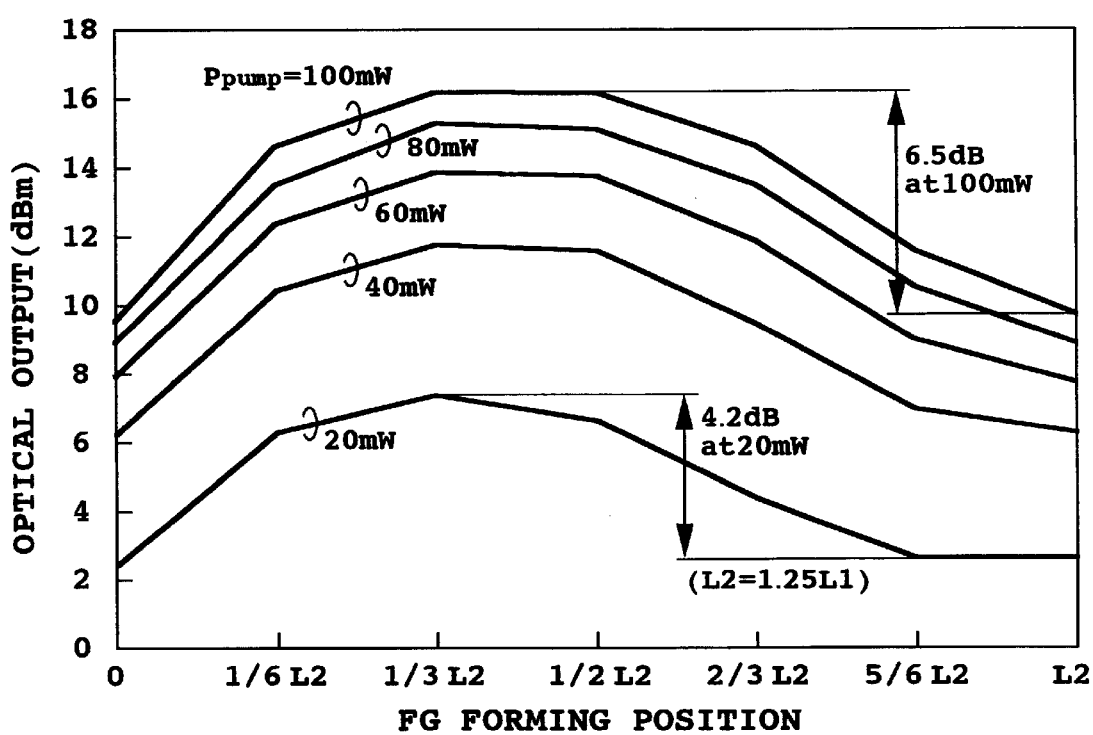
FIG. 8 is a graph showing the relation between fiber grating forming portion and optical output when the length of the optical amplifying fiber is an increased length L2 equal to 1.25L1.
Figure 9:
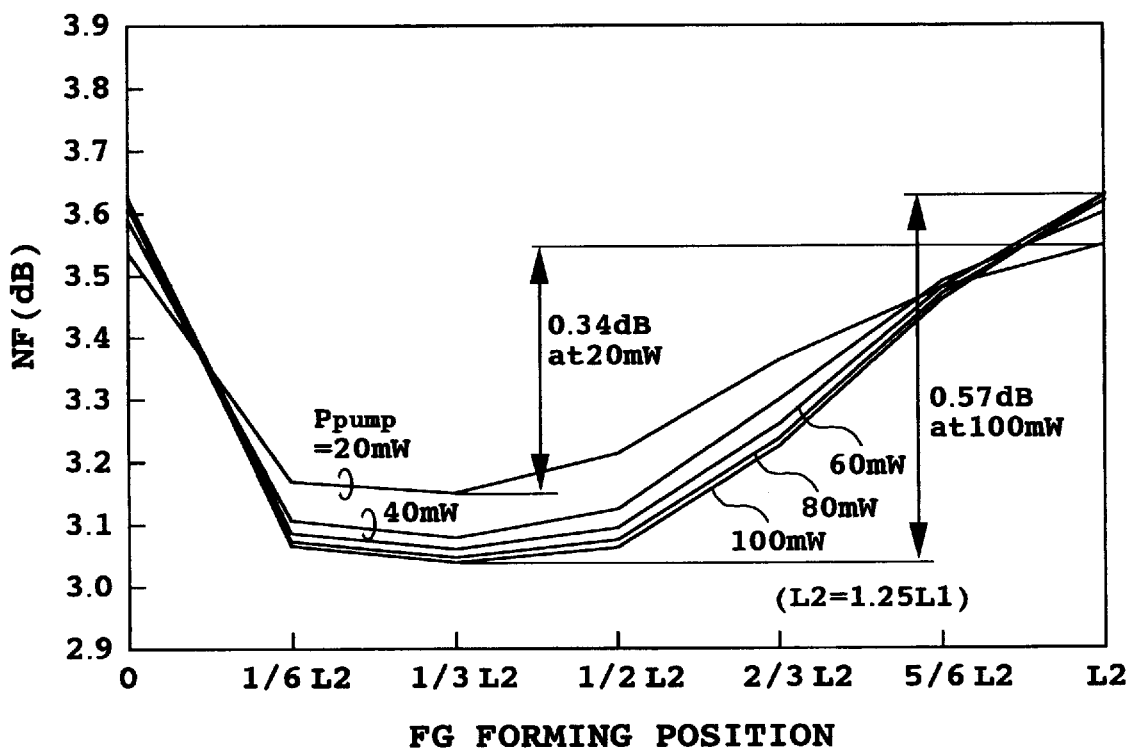
FIG. 9 is a graph showing the relation between fiber grating forming portion and NF when the length of the optical amplifying fiber is an increased length L2 equal to 1.25L1.

FIG. 8 shows the relation between position of the fiber grating 34 and optical output, and FIG. 9 shows the relation between position of the fiber grating 34 and NF in the case that the entire length of the Er doped fiber is increased (i.e., L2=1.25L1). As apparent from FIGS. 8 and 9, increasing the entire length of the Er doped fiber causes not only an increase in optical output, but also an increase in NF. It is also apparent that the position of the fiber grating is set preferably in the range of about 17% to about 50% of the entire length of the Er doped fiber as measured from the most upstream end thereof.

Figure 11:
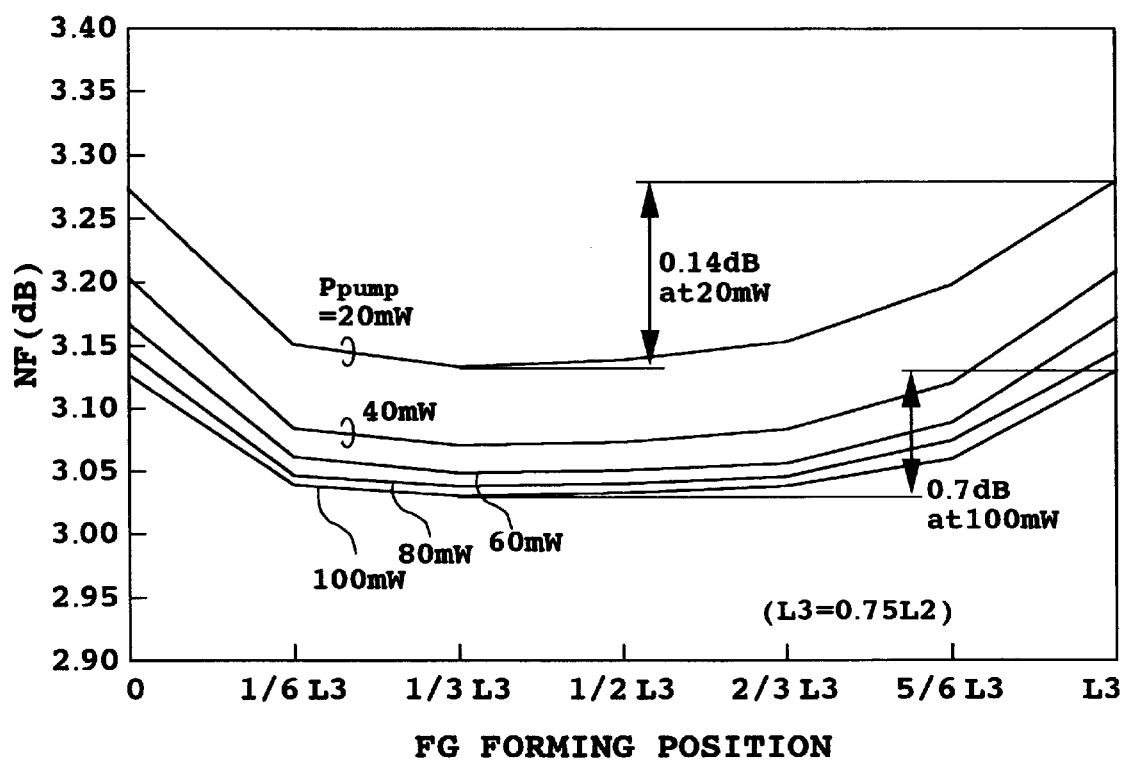
FIG. 11 is a graph showing the relation between fiber grating forming portion and NF when the length of the optical amplifying fiber is a decreased length L3 equal to 0.75L1.

FIG. 10 shows the relation between position of the fiber grating 34 and optical output, and FIG. 11 shows the relation between position of the fiber grating 34 and NF in the case that the entire length of the Er doped fiber is decreased (i.e., L3=0.75L1). As apparent from FIGS. 10 and 11, decreasing the entire length of the Er doped fiber causes not only a decrease in optical output, but also a decrease in NF. It is also apparent that the position of the fiber grating is set preferably in the range of about 17% to about 50% of the entire length of the Er doped fiber as measured from the most upstream end thereof.

Figure 12:
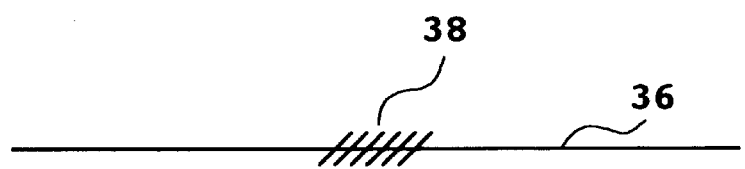
FIG. 12 is a schematic view showing a first preferred embodiment of the present invention.

Referring to FIG. 12, there is shown an optical amplifying fiber 36 according to a first preferred embodiment of the present invention. The optical amplifying fiber 36 is an Er doped fiber having a core doped with erbium. A fiber grating 38 for transmitting signal light and pump light and removing ASE is formed at a position upstream of a middle point of the entire length of the Er doped fiber 36 in terms of a propagation direction of signal light. Preferably, the fiber grating 38 is a long-period fiber grating having a period of about 100 μm to about a few 100 μm.

When ultraviolet light having wavelengths near 240 nm is directed to a silica-base glass fiber having a core doped with germanium, defects are generated in the glass lattice to increase a refractive index. This property is called a photorefractive effect, By utilizing this property and directing ultraviolet light to an optical fiber having a germanium doped core periodically in its longitudinal direction, the refractive index of the core can be periodically increased.

When the period of the refractive index change is about 0.5 μm, the optical fiber becomes a narrow-band reflection filter in which a guided mode in a traveling direction and a guided mode in a reflecting direction are coupled together to sharply reflect light of only specific wavelengths in a 1.55 μm band. On the other hand, when the period is changed to about 100 μm to about a few 100 μm, the power of the guided mode in the optical fiber can be coupled to a cladding mode. In this case, the coupling intensity has wavelength selectivity, and the power coupled to the cladding mode almost becomes loss. Accordingly, this device functions as a reflectionless wide-band filter. This device is called a long-period fiber grating (LPFG).

Figure 13:
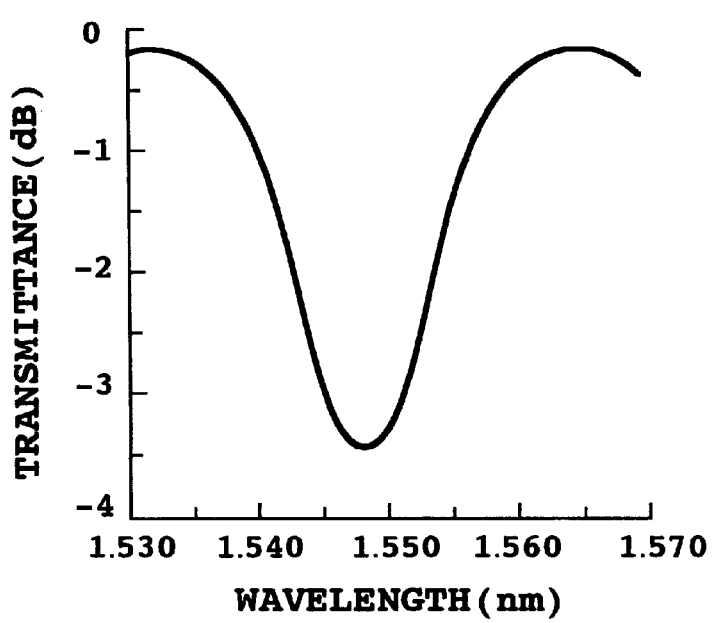
FIG. 13 is a graph showing an example of the transmittance characteristic of a long-period fiber grating.

To ensure a large attenuation of ASE generated in the Er doped fiber 36 in this preferred embodiment, such a long-period fiber grating is adopted as the fiber grating 38. The long-period fiber grating 38 has a rejection band width of about 10 nm to about a few 10 nm. An example of the transmittance characteristic of a long-period fiber grating is shown in FIG. 13.

Figure 14:
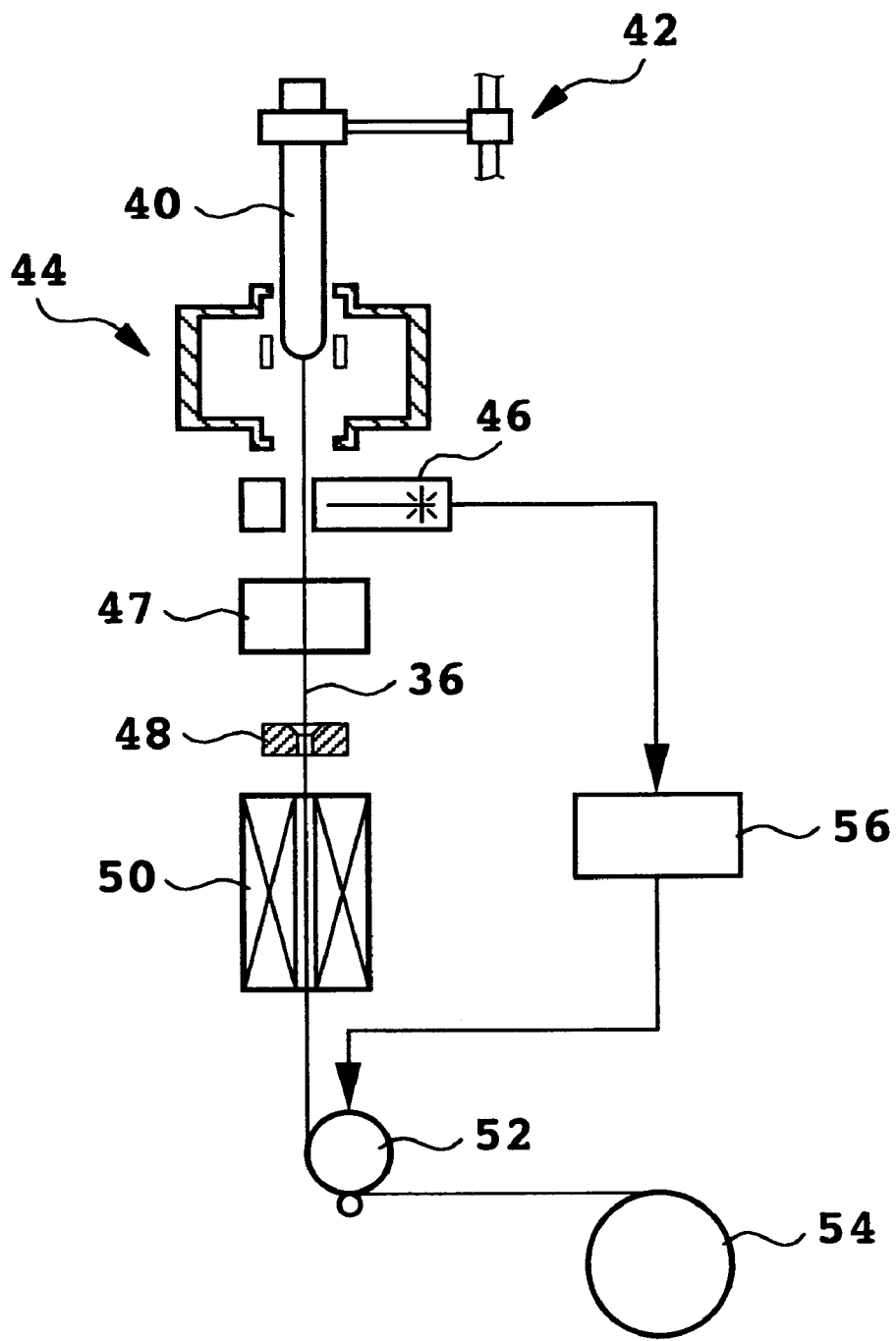
FIG. 14 is a schematic view showing a drawing apparatus for an Er doped fiber.

There will now be described a manufacturing method for an Er doped fiber having a fiber grating with reference to FIGS. 14 to 16. Referring to FIG. 14, there is shown a schematic view of an apparatus for drawing an optical fiber from a preform 40. The preform 40 is supported by a preform supporting portion 42, and is gradually fed downward so that a lower end portion of the preform 40 is heated and melted in a drawing furnace 44. The preform 40 thus melted is drawn from a lower end portion of the drawing furnace 44 to become an Er doped fiber 36 (bare fiber). The diameter of the Er doped fiber 36 is measured in a noncontact fashion by a diameter measuring portion 46. Subsequently, the Er doped fiber 36 is fed into a CVD reactor 47 heated to about 1500° C. to react with a hydrocarbon gas, so that the surface of the Er doped fiber 36 is coated with carbon.

The Er doped fiber 36 thus coated with carbon is further coated with ultraviolet (UV) curable epoxy resin by a coating device 48, and the resin coating is next cured by an ultraviolet lamp 50. The Er doped fiber 36 with the UV curable epoxy resin coating is next wound by a takeup drum 54 through a capstan roller 52 rotating at a controlled speed.

The rotating speed of the capstan roller 52 is feedback controlled by a diameter control portion 56 so that the diameter of the Er doped fiber 36 measured by the diameter measuring portion 46 is maintained constant. By using such a drawing apparatus and a preform, the Er doped fiber 36 can be manufactured with its characteristics such as doping concentrations of erbium and aluminum and diameters of fiber components being stable in the longitudinal direction of the fiber.

In the next step, the UV curable epoxy resin coating of the Er doped fiber 36 manufactured above at a fiber grating forming portion where a fiber grating is to be formed later is removed. Then, the carbon coating at this portion where the resin coating has been removed is removed by electric discharge. Then, the Er doped fiber 36 whose resin coating and carbon coating have been partially removed is introduced into a hydrogen atmosphere to thereby expose only the fiber grating forming portion to the hydrogen atmosphere. The reason why the Er doped fiber 36 is introduced into the hydrogen atmosphere is to facilitate the later formation of the fiber grating by ultraviolet irradiation.

As an alternative method for locally exposing the fiber grating forming portion to the hydrogen atmosphere, the following method may also be adopted. That is, the UV curable epoxy resin coating is applied directly to the bare fiber. Then, the resin coating at the fiber grating forming portion is removed, and the Er doped fiber is introduced into the hydrogen atmosphere with the fiber grating forming portion being heated. Also by this method, the fiber grating forming portion of the Er doped fiber can be locally exposed to the hydrogen atmosphere.

Figure 15:
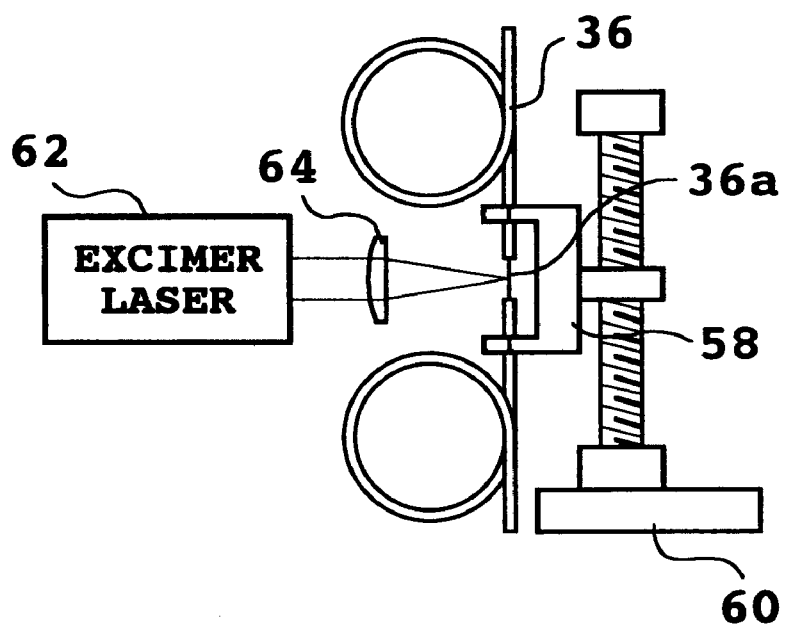
FIG. 15 is a schematic view showing a manufacturing apparatus for a long-period fiber grating.

In the next step, the Er doped fiber 36 is fixed at a given position by using a movable stage 58 as shown in FIG. 15. The movable stage 58 is movable by a step motor 60. A Kr—F excimer laser 62 having an excitation wavelength of 248 nm, for example, may be used as an ultraviolet light source. Ultraviolet light from the excimer layer 62 is focused by a lens 64 to be directed onto the side surface of the Er doped fiber 36.

After a given period of time for the ultraviolet irradiation, the Er doped fiber 36 is shifted in an amount corresponding to a desired grating period, and ultraviolet light is directed again onto the Er doped fiber 36 for a given period of time. This operation is repeated given times to thereby obtain a long-period fiber grating 38 as shown in FIG. 16. Alternatively, ultraviolet light may be directed onto the Er doped fiber at a time by using a mask with a given period (pitch). Preferably, the portion of the Er doped fiber 36 where the fiber grating 38 has been formed is heated to remove thermally instable defects. This heating operation allows long-term stability of the long-period fiber grating 38.

Figure 16:
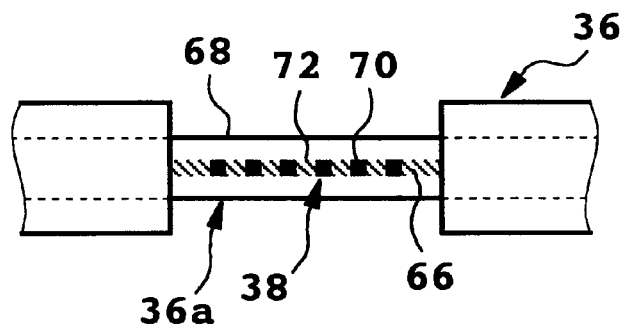
FIG. 16 is a schematic view showing the structure of the long-period fiber grating.

As shown in FIG. 16, the Er doped fiber 36 has a core 66 doped with Er and a cladding 68 surrounding the core 66. The long-period fiber grating 38 is formed in an uncoated portion 36a of the Er doped fiber 36 where the resin coating and the carbon coating have been removed. Reference numeral 70 denotes an ultraviolet exposed portion, and reference numeral 72 denotes an ultraviolet unexposed portion. The ultraviolet exposed portion 70 has a refractive index higher than that of the ultraviolet unexposed portion 72. Preferably, the long-period fiber grating 38 has a period of about 100 μm to about a few 100 μm.

Figure 17:
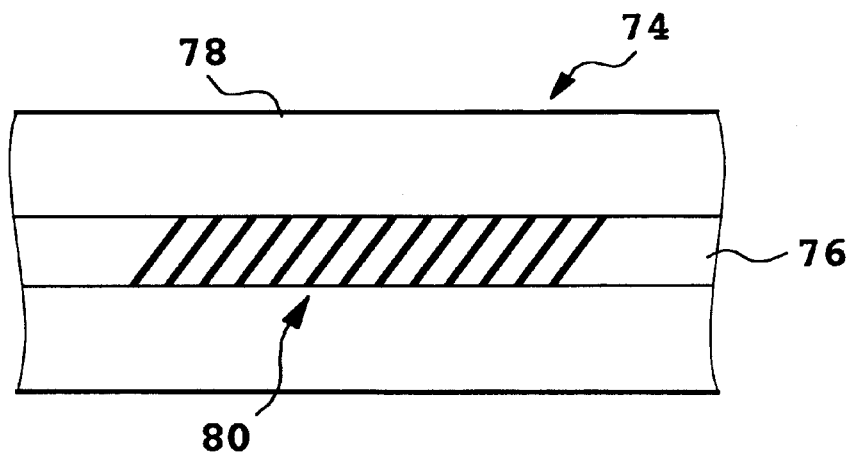
FIG. 17 is a schematic view showing a blazed grating.

The long-period fiber grating 38 may be replaced by a blazed grating 80 formed in a core 76 of an Er doped fiber 74 as shown in FIG. 17. The core 76 is surrounded by a cladding 78 of the Er doped fiber 74. The blazed grating 80 is inclined a given angle to the longitudinal direction of the Er doped fiber 74. Like the long-period fiber grating 38, the blazed grating 80 can couple the power of the guided mode in the Er doped fiber 74 to the cladding mode, thereby efficiently removing ASE.

Figure 18:
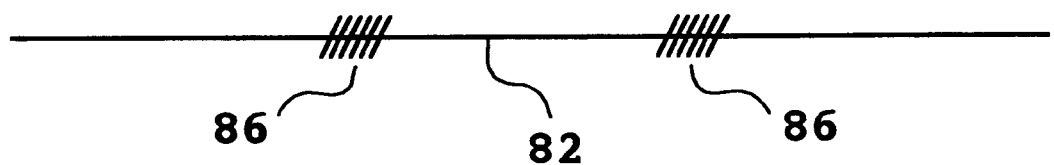
FIG. 18 is a schematic view showing a second preferred embodiment of the present invention.

Referring to FIG. 18, there is shown an optical amplifying fiber according to a second preferred embodiment of the present invention. An Er doped fiber 82 in this preferred embodiment has a first fiber grating 84 formed at a position upstream of a middle point of the entire length of the Er doped fiber 82 in terms of a propagation direction of signal light and a second fiber grating 86 formed at a position downstream of the first fiber grating 84 in terms of the propagation direction. Preferably, each of the first and second fiber gratings 84 and 86 is a long-period fiber grating for transmitting signal light and pump light and removing ASE.

Figure 19:
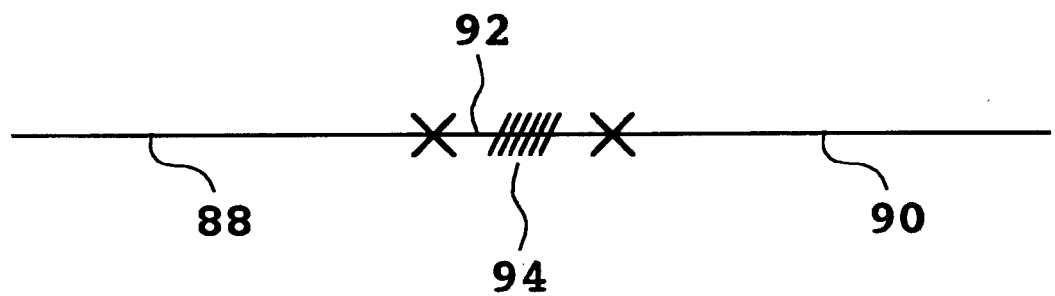
FIG. 19 is a schematic view showing a third preferred embodiment of the present invention.

Referring to FIG. 19, there is shown an optical amplifying fiber assembly according to a third preferred embodiment of the present invention. In this preferred embodiment, a single-mode fiber 92 is spliced between a first Er doped fiber 88 and a second Er doped fiber 90. A long-period fiber grating 94 is formed in the single-mode fiber 92. The second Er doped fiber 90 is longer than the first Er doped fiber 88. In operation, the first Er doped fiber 88 is positioned upstream of the second Er doped fiber 90 in terms of a propagation direction of signal light.

While erbium is used as a rare earth element in the above preferred embodiments, the present invention is applicable also in the case that any one of the other rare earth elements such as Nd and Yb is used instead of Er. According to the present invention, a fiber grating is formed directly in an optical amplifying fiber, and a forming position of the fiber grating is optimized, so that ASE can be easily removed with a simple configuration to thereby increase an amplification efficiency of signal light.

What is claimed is:

1. An optical amplifying fiber comprising:
    a core doped with a rare earth element and having a first refractive index;
    a cladding surrounding said core and having a second refractive index smaller than said first refractive index; and
    a fiber grating formed in said core for transmitting signal light having a first wavelength and pump light having a second wavelength and removing amplified spontaneous emission, said fiber grating being formed in the range of about 17% to about 50% of the entire length of said optical amplifying fiber as measured from a most upstream end of said optical amplifying fiber in terms of a propagation direction of signal light.

2. An optical amplifying fiber according to claim 1, wherein said fiber grating has a period of about 100 $\mu$m to about a few 100 $\mu$m.

3. An optical amplifying fiber according to claim 1, wherein said fiber grating is inclined to a longitudinal direction of said optical amplifying fiber.

4. An optical amplifying fiber assembly comprising:
    a first doped fiber having a core doped with a rare earth element and having a first length;
    a second doped fiber having a core doped with a rare earth element and having a second length longer than the first length, such that the first length is in the range of from about 17% to about 50% of said second length;
    a single-mode fiber interposed between said first and second doped fibers and having opposite ends connected to said first and second doped fibers; and
    a fiber grating formed in said single-mode fiber for transmitting signal light having a first wavelength and pump light having a second wavelength and removing amplified spontaneous emission;
    said first doped fiber being positioned upstream of said second doped fiber in terms of a propagation direction of signal light.

5. An optical amplifying fiber assembly according to claim 4, wherein said first length is in the range of about 17% to about 50% of said second length.

6. An optical amplifying fiber assembly according to claim 4, wherein said fiber grating has a period of about 100 $\mu$m to about a few 100 $\mu$m.

7. An optical amplifying fiber assembly according to claim 4, wherein said fiber grating is inclined to a longitudinal direction of said single-mode fiber.

8. An optical amplifying fiber comprising:
    a fiber grating having upstream and downstream ends;
    a first doped fiber portion connected to the upstream end of the fiber grating and having a first length;
    a second doped fiber portion connected to a downstream end of the fiber grating and having a second length longer than the first length, the first length being in the range of from about 17% to about 50% of the second length.

* * * * *